(12) United States Patent
Bauer

(10) Patent No.: US 11,130,505 B2
(45) Date of Patent: Sep. 28, 2021

(54) SYSTEM FOR ILLUMINATING A RAIL VEHICLE AND RAIL VEHICLE

(71) Applicant: SIEMENS MOBILITY GMBH, Munich (DE)

(72) Inventor: Thomas Bauer, Hallerndorf (DE)

(73) Assignee: Siemens Mobility GmbH, Munich (DE)

( * ) Notice: Subject to any disclaimer, the term of this patent is extended or adjusted under 35 U.S.C. 154(b) by 127 days.

(21) Appl. No.: 16/488,763

(22) PCT Filed: Dec. 28, 2017

(86) PCT No.: PCT/EP2017/084714
§ 371 (c)(1),
(2) Date: Aug. 26, 2019

(87) PCT Pub. No.: WO2018/153538
PCT Pub. Date: Aug. 30, 2018

(65) Prior Publication Data
US 2021/0139055 A1    May 13, 2021

(30) Foreign Application Priority Data
Feb. 24, 2017 (DE) .................. 10 2017 203 018.6

(51) Int. Cl.
*B61D 29/00* (2006.01)
*B61L 15/02* (2006.01)

(52) U.S. Cl.
CPC .............. *B61D 29/00* (2013.01); *B61L 15/02* (2013.01); *B60Y 2200/30* (2013.01)

(58) Field of Classification Search
None
See application file for complete search history.

(56) References Cited

U.S. PATENT DOCUMENTS

| 5,770,998 A * | 6/1998 | Choi .................. B60Q 1/444 340/463 |
| 2011/0018441 A1* | 1/2011 | Tanaka ................. H05B 47/22 315/82 |
| 2011/0279056 A1 | 11/2011 | Waelti et al. |
| 2012/0236554 A1 | 9/2012 | Rust |
| 2013/0093324 A1* | 4/2013 | Brown ................ B60Q 11/002 315/77 |
| 2014/0300282 A1 | 10/2014 | Grave et al. |
| 2015/0102745 A1 | 4/2015 | Pijlman et al. |

(Continued)

FOREIGN PATENT DOCUMENTS

| DE | 93182296 U1 | 2/1994 |
| DE | 202012003301 U1 | 6/2012 |

(Continued)

*Primary Examiner* — Elmito Breval
(74) *Attorney, Agent, or Firm* — Laurence A. Greenberg; Werner H. Sterner; Ralph E. Locher

(57) ABSTRACT

An arrangement for lighting a rail vehicle includes at least one energy source, at least one controller, at least one lighting device, at least one electrical line for connecting the energy source to the at least one controller and an electrical line for connecting the controller to the at least one lighting device. Each lighting device includes at least one adjacent controller. A rail vehicle with the lighting arrangement is also provided.

14 Claims, 2 Drawing Sheets

(56) References Cited

U.S. PATENT DOCUMENTS

2016/0165691 A1* 6/2016 Fassbender ............ H05B 45/37
  315/149
2017/0151962 A1   6/2017 Takagi
2017/0171949 A1*  6/2017 Kim ..................... H04B 10/502

FOREIGN PATENT DOCUMENTS

| DE | 102012005480 A1 | 9/2013 |
| DE | 102012011075 A1 | 12/2013 |
| DE | 102012017656 A1 | 3/2014 |
| DE | 102013219121 A1 | 3/2015 |
| KR | 1020160085655 A | 7/2016 |
| RU | 159043 U1 | 1/2016 |
| WO | 2013171627 A2 | 11/2013 |

* cited by examiner

SYSTEM FOR ILLUMINATING A RAIL VEHICLE AND RAIL VEHICLE

BACKGROUND OF THE INVENTION

Field of the Invention

The invention relates to an arrangement for lighting a rail vehicle, and to a rail vehicle having such an arrangement.

Rail vehicles have a controller for actuating and monitoring the lighting system, in particular the external lighting system. Each lighting means is in this case connected individually to the controller. This requires a great deal of installation space for the components that are required here and extensive wiring over the entire extent of the rail vehicle, which extensive wiring is subject to increased susceptibility to faults. Furthermore, such wiring to be laid over large distances has a high installation expenditure and a not inconsiderable mass of cables. A controller is responsible inter alia for actuating and monitoring the entire lighting system. In the event of the controller failing, this means a complete failure of the lighting system, such that an emergency lighting system is then only able to be activated by way of emergency switches. Since the controller usually also takes on the function of an interface to the control technology, a large number of digital inputs and outputs are required. The installation space in a driver's console of a rail vehicle is however greatly limited. In addition to this, possible installation space for laying cables in the region of walls and ceilings in other regions of the rail vehicle is also restricted.

Korean Patent Application KR 2016 0085655 A discloses a device for controlling an LED light output of a diesel locomotive.

German Patent Application DE 10 2012 005480 A1 discloses an external light arrangement for a rail vehicle. This has an external light having at least one lighting means and an operation display device. The operation display device is used to display an operating state of the external light. At least one light guide is furthermore provided, having a first end region which is arranged close to the at least one lighting means in the external light and is designed to couple in part of the light emitted by the at least one lighting means. Its second end region is arranged in the operation display device.

SUMMARY OF THE INVENTION

The object of the invention is to propose an arrangement for lighting a rail vehicle that overcomes the abovementioned disadvantages and ensures a lighting system for a rail vehicle that requires only little installation space and has a lower susceptibility to faults. The object of the invention is furthermore to propose a rail vehicle having such an arrangement.

The object is achieved by the subject matter of the independent patent claims. Advantageous configurations of the invention form the subject matter of respectively dependent subclaims.

According to one aspect of the invention, what is provided is an arrangement for lighting a rail vehicle that has at least one energy source, at least one controller and at least one lighting means. The energy source is connected to the at least one controller by way of at least one electrical line. The controller is in turn connected to the at least one lighting means by way of an electrical line, wherein each lighting means in each case has at least one adjacent controller.

By virtue of the arrangement in which a respective controller in each case monitors and actuates a lighting means, it is possible to dispense with complex wiring to a central controller in order to control the lighting system. The term wiring in this case includes not only electrical lines but also the numerous connectors and plugs that are necessary to connect each lighting means to a central controller. The proposed arrangement is preferably used for the lighting system of a locomotive, in particular the external lighting system thereof, wherein a use for the internal lighting system or other loads, such as for example doors or the like, is also conceivable. By virtue of reducing the wiring required for the lighting system, installation space is able to be saved for example in the driver's console of the locomotive, which installation space is available only to a limited extent, such that more installation space is available for other systems. Due to the lower number of components that are required and the wiring whose length is many times shorter, the arrangement is considerably less susceptible to faults and less intensive in terms of maintenance. Installation expenditure is furthermore able to be reduced by reducing the number of cables and connections. As a result, the manufacture or repair of a rail vehicle is able to be sped up.

According to one exemplary embodiment of the arrangement for lighting a rail vehicle, the controller and the lighting means are configured so as to be integral. In this case, the controller and the lighting means may be encapsulated, welded, screwed or cast inside one another or to one another. The module that is thereby formed allows simple installation, and separate and complex wiring of the controller to the lighting means is able to be dispensed with. In the event of a defect, the entire module is able to be replaced quickly and easily. By virtue of the reduced number of components, it is possible to reduce maintenance and repair expenditure, as a result of which the downtime of rail vehicles is able to be greatly reduced overall. The at least one lighting means may also in this case be connected interchangeably to the controller.

According to a further exemplary embodiment of the arrangement, the at least one controller has an interface to control technology of the rail vehicle. As a result, the controller is able to be connected directly or indirectly to the control system of the rail vehicle. This allows a transmission of information, such that for example a failure of a lighting means is able to be detected from the driver's cabin. In addition or as an alternative, the operating mode (for example ON or OFF, and a possible dimming function) of the lighting means may be viewed and controlled from the driver's cabin. The information may be transmitted to the vehicle driver, for example in the form of analog or digital displays or light signals. The control technology may additionally have an additional monitoring device that may list and analyze states of all of the controllers and therefore also all of the lighting means for maintenance or repair purposes. Advantageously, the control technology may have an additional interface for the connection of analysis tools, such as for example notebooks, computers or test benches equipped with appropriate software.

According to a further exemplary embodiment of the arrangement for lighting a rail vehicle, the control technology has at least one central controller. Each lighting means may thus be connected to a central controller by way of the respective integrally or adjacently arranged controller, and be coordinated by the central controller. The central controller may communicate with the control center and in this case for example be arranged close to or in a driver's cabin. By virtue of such an arrangement and the use of a controller integrally connected to a lighting means, it is possible to significantly reduce the required amount of wiring, including connectors, lines and plugs, since complex wiring for each individual lighting means to a central controller that at the same time constitutes an interface to the control technology is dispensed with. Furthermore, by virtue of the decentralized arrangement of the adjacent controllers or of the controllers integrated into the lighting means, the size of the central controller, which is usually arranged in the highly spatially restricted driver's console or the driver's cabin, is able to be considerably reduced.

According to a further exemplary embodiment of the arrangement, the at least one controller of the at least one lighting means and the at least one controller of the control technology have a wireless or wired communication connection. Each controller may in this case have a wireless communication interface or communication unit. Information and commands are able to be transmitted using the communication unit. Radio, Bluetooth, WLAN, an infrared connection and other such transmission technology could be used, for example. As a result, the wiring for the purpose of transmitting information and controlling or regulating the lighting means is able to be dispensed with completely. The respective controllers may instead communicate wirelessly directly with a central controller or communicate with the central controller or control center respectively by way of other controllers that serve, as an alternative or in addition, as repeaters. In this case, the existing decentralized controllers having a wireless communication interface may also forward the information or commands of other controllers as repeaters. Advantageously, the decentralized controllers and the at least one central controller are able to communicate jointly and separately with one another. Wiring is thus required only for the direct power connection and is able to be designed in a considerably reduced form in comparison with a connection expenditure for a cabled or wired information transmission system. A wired communication connection or communication transmission may be configured for example in the form of a bus system, such as for example a CAN (controller area network) bus system. As an alternative, a communication transmission may take place by way of optical waveguides in the form of digital light signals.

According to a further exemplary embodiment of the arrangement, the wired or wireless communication connection has coding. In this case, explicit commands are transmitted by coding the data in a defined manner. This may increase the security of the transmitted data, such that the information is able to be protected against manipulation by third parties. The commands and information to be transmitted may furthermore be converted in a digital or analog manner, such that, in the case of a wired communication connection, the number of electrical lines is minimized.

According to a further exemplary embodiment of the arrangement, the electrical lines are configured as a bus system. The respective controllers may in this case also be connected to existing bus systems and communicate with the control technology in a wired manner.

According to a further exemplary embodiment of the arrangement, each controller monitors at least one lighting means. Each lighting means is assigned a controller that is responsible solely for monitoring and actuating the assigned lighting means. The controllers respectively arranged on the lighting means may be configured so as to be smaller or less powerful than a central controller, for example. This thus makes it possible for the controllers to be arranged directly next to, in or close to the lighting means, as a result of which a shorter cable length and fewer components such as connectors and plugs are required in comparison with an arrangement having a central controller.

According to a further exemplary embodiment of the arrangement, the lighting means may consist of a plurality of light sources. By virtue of the presence of redundancy provided by a plurality of light sources, operational safety is able to be increased. In the event of a failure of a light source of a lighting means, the rail vehicle may continue to be lit by the remaining light sources in the lighting means, possibly with slight losses in brightness, without having to switch immediately to emergency lighting.

According to a further exemplary embodiment of the arrangement, the lighting means is configured using LED technology, xenon technology or halogen HDI technology. This offers extremely versatile possibilities for use. LED lighting means have for example very low energy consumption and a long life. Xenon lamps may be very effective in order for example to light a long distance away, and are very suitable for lighting the direction of travel. Combinations of a plurality of different types of lighting means in one or more lighting means are furthermore possible, depending on the field of use. LEDs may be connected for example to a decentralized controller such that an exchange is not possible. By way of example, both components may be molded or adhesively bonded to one another. As an alternative, lighting means or individual light sources may be integrated into a decentralized controller. As a result, it is possible to achieve improved protection against environmental influences and easier manufacture.

According to a further exemplary embodiment of the arrangement for lighting a rail vehicle, each lighting means has a dedicated fuse. In the event of a failure of the lighting system, the search for the fault source is thereby able to be significantly reduced and therefore shortened, since it is possible to assign the fuses to the respective lighting means. This additionally increases the operational safety of the lighting system of the rail vehicle.

According to a further exemplary embodiment of the arrangement, the fuse of the lighting means is able to be actuated manually or automatically. The fuse may be configured for example as an automatic fuse that is able to be activated automatically in the event of excessively high loading. Such an automatic fuse may be able to be deactivated again for example directly or indirectly by a switch or by remote control.

According to a further exemplary embodiment of the arrangement, the at least one lighting means is able to be put into at least one operating state by the controller. In each case depending on different situations, various operating states or light signals may be necessary for a rail vehicle to operate safely. By way of example, in the case of reverse travel of a rail vehicle, a lighting system different from the one in the case of a forward-pointing direction of travel may be necessary. This may be advantageous in particular in the case of rail vehicles having drive cars arranged at both ends. The controller may advantageously for example dim, switch on or switch off the lighting means. Further signals, such as flashing or the like, are also possible. The decentralized controller may for example determine an operating state of the lighting means through direct or active actuation, or automatically by way for example of an identified operating state of the rail vehicle.

According to a further exemplary embodiment of the arrangement for lighting a rail vehicle, an operating state is for example an emergency lighting state, daytime lighting state or night-time lighting state. Various lighting modes are possible, which each regulate the lighting system of the rail vehicle differently depending on the type of operation or time of day requirements or brightness requirements. The lighting modes may in this case be able to be coupled to the operating mode of the rail vehicle. There may in this case be an automatic adjustment of the lighting system to the respective external conditions of the rail vehicle. The brightness in the surroundings of the rail vehicle could be detected by way of brightness sensors and forwarded in the form of a signal via the central controller to the separate or decentralized controllers of the respective lighting means. The controllers may then convert the signal into an operating state of the lighting means. As an alternative or in addition, other sensors such as temperature sensors or speed sensors may also determine additional information that is then processed by the controllers. Thus, when driving into a tunnel, the lighting means of the rail vehicle could come on automatically or amplify their light signal, and be dimmed again automatically when leaving the tunnel.

According to a further aspect of the invention, a rail vehicle having at least one driven or non-driven car having an arrangement for lighting a rail vehicle is provided. The arrangement has at least one energy source, at least one controller and at least one lighting means. The energy source is connected to the at least one controller by way of at least one electrical line. The controller is in turn connected to the at least one lighting means by way of an electrical line, wherein each lighting means has at least one adjacent controller.

BRIEF DESCRIPTION OF THE SEVERAL VIEWS OF THE DRAWING

The above-described properties, features and advantages of this invention and the manner in which they are achieved become more clearly and distinctly comprehensible by way of the explanation of the following greatly simplified schematic illustrations of preferred exemplary embodiments. In the figures.

DESCRIPTION OF THE INVENTION

Figure 1:
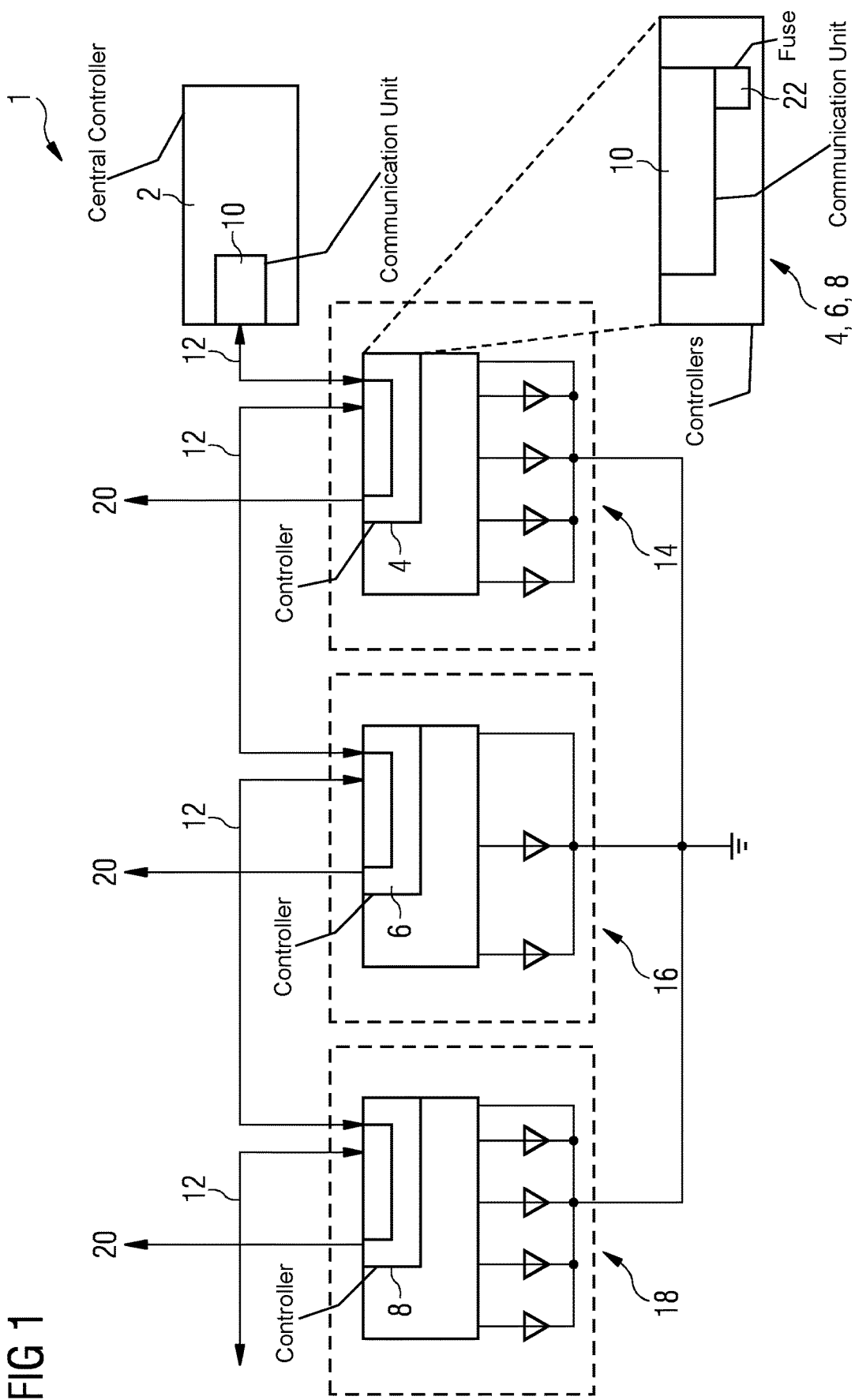
FIG. 1 shows a schematic illustration of an arrangement according to a first exemplary embodiment and FIG. 2 shows a schematic illustration of an arrangement according to a second exemplary embodiment.

In the figures, the same structural elements in each case have the same reference numerals.

FIG. 1 shows a schematic illustration of an arrangement 1 for lighting a rail vehicle according to the first exemplary embodiment. The arrangement 1 is illustrated in the form of a circuit diagram and is intended to clarify a connection of the relevant components of a rail vehicle. The arrangement 1 has a central controller 2 that is connected to control technology, not illustrated, and is able to be arranged in a region of a driver's cabin. The arrangement 1 furthermore has a plurality of separate controllers 4, 6, 8. The separate controllers 4, 6, 8 each have a standalone communication unit 10. The separate controllers 4, 6, 8 are able to be connected to one another and to the central controller 2 by way of the communication unit 10. The central controller 2 likewise has a communication unit 10. Information and commands are able to be exchanged by way of a communication connection 12. The commands may in this case be digital or analog control commands or regulation commands that trigger or report particular functions or operating states. The communication connection 12 is a wired bus system 12 according to the exemplary embodiment. The bus system 12 according to the exemplary embodiment does not connect each separate or decentralized controller 4, 6, 8 to the central controller 2. The separate controllers 4, 6, 8 are instead connected in a series circuit by way of the bus system 12. As a result, the bus system needs to be laid only once along the required length and not separately for each individual controller 4, 6, 8, and thus not multiple times in parallel next to one another. Each separate controller 4, 6, 8 has a plurality of connected lighting means 14, 16, 18. The controllers 4, 6, 8 are in this case configured so as to be integral with the lighting means 14, 16, 18. The lighting means 14 are for example headlights, direction indicators or position lights, and optionally switchable reverse lights, arranged on a front end of a rail vehicle. The lighting means 18, like the lighting means 14, may be arranged on a rear end of a rail vehicle. The lighting means 16 may be arranged in an external region of a rail vehicle and light surroundings of the rail vehicle in order to facilitate disembarking. As an alternative or in addition, the lighting means 16 may also be arranged inside wagons of the rail vehicle and serve as an internal lighting system. Each of the separate controllers 4, 6, 8 is connected to an energy supply 20, independently of the bus system 12. The separate controllers 4, 6, 8 may thus actuate the lighting means 14, 16, 18 depending on or independently of a signal transmitted by way of the bus system. By way of example, the separate controllers 4, 6, 8 may put the lighting means 14, 16, 18 into an emergency lighting state in the event of a missing signal. When the rail vehicle is started or during a starting phase, the separate controllers 4, 6, 8 may receive corresponding information from the central controller 2 and use the lighting system so as to save as much power as possible, such that the rail vehicle is ready for operation more quickly. The central controller 2 may furthermore transmit an operating state of the rail vehicle, such as for example a direction of travel, a stationary state, or a stop at a station, by way of the bus system 12. Depending on the operating state of the rail vehicle, the separate controllers 4, 6, 8 may actuate the lighting means 14, 16, 18 and thus jointly or separately switch on, switch off, dim or brighten the lighting means 14, 16, 18, or initiate flashing of the lighting means 14, 16, 18. In order that operational safety of the separate controllers 4, 6, 8 is able to be ensured, the separate controllers 4, 6, 8 have at least one fuse 22. The fuse 22 is tripped when a short circuit or a defect occurs in the region of the respective separate controller 4, 6, 8 or the respective lighting means 14, 16, 18. Depending on tripping of the respective fuse 22, the respective separate controllers 4, 6, 8 may transmit information about the tripping of the fuse 22 and the location of the fuse 22 to the central controller 2, and thus also transmit this indirectly to the control technology of the rail vehicle.

Figure 2:
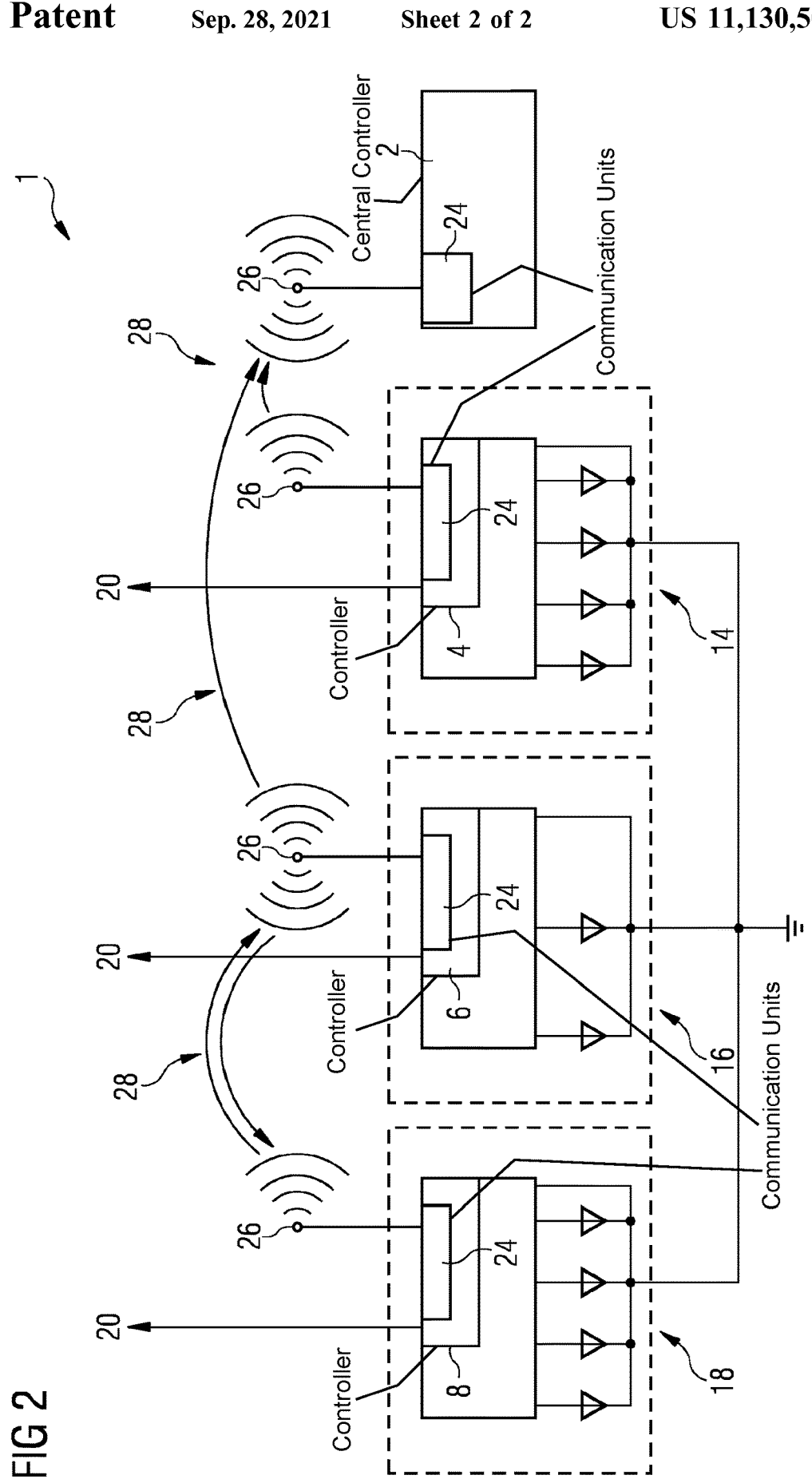

FIG. 2 shows a schematic illustration of an arrangement 1 according to a second exemplary embodiment. Unlike the arrangement 1 according to the first exemplary embodiment, the decentralized controllers 4, 6, 8 and the central controller 2 each have wireless communication units 24. Each wireless communication unit 24 has a radio antenna 26. The communication unit 24 is thus able to transmit and receive information by way of radio signals. The wireless connection 28 or wireless communication connection 28 may in this case be created between the decentralized controllers 4, 6, 8 with one another. Each decentralized controller 4, 6, 8 may in this case also separately create a wireless connection 28 to the central controller 2. The wireless connection 28 to the central controller 2 may in this case also be created indirectly by way of a controller lying in the radio path or an adjacent controller 4, 6, 8. In this case, the communication units 24 of the controllers 4, 6, 8 may act as signal amplifiers. Information or commands thus may be transmitted from the central controller 2 to a decentralized controller 4, 6, 8. This may also be carried out over long distances, such as for example in the case of long rail vehicles without wired communication. In the opposite direction, information may likewise be transmitted in series over a plurality of controllers 4, 6, 8. Commands or information thus may be transmitted from a wireless communication unit 24 to an adjacent wireless communication unit 24, which in turn forwards the commands or information to a next wireless communication unit 24. This procedure may be carried out for as long as the information or commands may be received by the central controller 2.

Although the invention has been described and illustrated in more detail by way of the preferred exemplary embodiments, the invention is not restricted by the disclosed examples and other variations may be derived therefrom by a person skilled in the art without departing from the scope of protection of the invention.

The invention claimed is:

1. An arrangement for lighting a locomotive of a rail vehicle, the arrangement comprising:
    a central controller having a communication unit;
    a plurality of replaceable modules installed in installation spaces in the locomotive, each of said modules containing a respective controller and a respective lighting device being integral with each other, adjacent each other and interconnected by a respective electrical line, said controllers each having a respective communication unit;
    a wired or wireless communication system interconnecting said communication unit of said central controller and said communication units of said controllers of said modules in a series circuit;
    a plurality of energy sources; and
    a plurality of electrical lines each connecting a respective one of said energy sources to a respective one of said controllers of said modules.

2. The arrangement according to claim 1, wherein said at least one controller and said at least one lighting device are encapsulated, welded, screwed or cast inside one another or to one another.

3. The arrangement according to claim 1, wherein said at least one controller has an interface to control technology of the rail vehicle.

4. The arrangement according to claim 1, wherein said at least one controller adjacent said at least one lighting device and said at least one controller of said control technology have a wireless or wired communication connection.

5. The arrangement according to claim 4, wherein said wireless or wired communication connection has coding.

6. The arrangement according to claim 1, wherein said electrical lines are configured as a bus system.

7. The arrangement according to claim 1, wherein each said at least one controller monitors said at least one lighting device.

8. The arrangement according to claim 1, wherein said at least one lighting device includes one or more light sources.

9. The arrangement according to claim 1, wherein said at least one lighting device uses LED technology, xenon technology or halogen technology.

10. The arrangement according to claim 1, wherein each said at least one lighting device has a dedicated fuse.

11. The arrangement according to claim 10, wherein said fuse is configured to be actuated manually or automatically.

12. The arrangement according to claim 1, wherein said at least one lighting device is configured to be put into at least one operating state by said at least one controller.

13. The arrangement according to claim 12, wherein said at least one operating state includes an emergency lighting state, a daytime lighting state or a night-time lighting state.

14. A rail vehicle, comprising at least one driven or non-driven car, and an arrangement according to claim 1.

* * * * *